United States Patent [19]
Bass et al.

[11] Patent Number: 6,001,500
[45] Date of Patent: Dec. 14, 1999

[54] CYLINDRICAL PROTON EXCHANGE MEMBRANE FUEL CELLS AND METHODS OF MAKING SAME

[76] Inventors: Edward Albert Bass, 6911 Willow Oak, San Antonio, Tex. 78249; Patrick Martin Merritt, 16507 Parkstone Blvd.; Christopher Alan Sharp, 138 William Classen, both of San Antonio, Tex. 78232; Craig Marshall Wall, 1614 E. Park Ave., San Antonio, Tex. 78212; John Campbell, 4654 Callaghan Rd., San Antonio, Tex. 78228

[21] Appl. No.: 08/869,795

[22] Filed: Jun. 5, 1997

Related U.S. Application Data

[60] Provisional application No. 60/019,182, Jun. 5, 1996.

[51] Int. Cl.$^6$ ....................................................... H01M 8/10
[52] U.S. Cl. ................................. 429/31; 429/33; 429/34; 429/41; 429/46
[58] Field of Search ................................. 429/31, 34, 40, 429/33, 41, 46

[56] References Cited

U.S. PATENT DOCUMENTS

| | | | |
|---|---|---|---|
| 3,291,753 | 12/1966 | Thompson et al. | 502/101 |
| 3,413,152 | 11/1968 | Folkins et al. | 429/13 |
| 3,423,247 | 1/1969 | Darland, Jr. et al. | 429/40 |
| 4,551,220 | 11/1985 | Oda et al. | 204/294 |
| 5,151,334 | 9/1992 | Fushimi et al. | 429/32 |
| 5,336,570 | 8/1994 | Dodge, Jr. | 429/31 |
| 5,458,989 | 10/1995 | Dodge | 429/31 |
| 5,509,942 | 4/1996 | Dodge | 29/623.2 |

OTHER PUBLICATIONS

S. Mukerjee, et al., "Effect of Sputtered Film of Platinum on Low Loading Electrodes on Electrode Kinetics of Oxygen Reduction in Proton Exchange Membrane Fuel Cells." *Electrochemical Acta* V. 38, No. 12 pp. 1661–1669 (1993).

E. J. Taylor, et al. "Preparation of High–Platinum–Utilization Gas Diffusion Electrodes for Proton–Exchange–Membrane Fuel Cells." *Electrochemical Society Letters* V. 139, No. 5 pp. L45–46(May 1992).

Nafion, "Heat Sealing Machine." *Technical Information Bulletin* 91–01 (Feb. 1991).

Nafion, "Heat Seal Repair of NAFION Membrane." *Technical Information Bulletin* 91–02.

Nafion, "Perfluorosulfonic Acid Membrane." *Product Bulletin*.

*Primary Examiner*—Maria Nuzzolillo
*Assistant Examiner*—Laura Weiner

[57] ABSTRACT

The present invention provides a method of manufacturing a cylindrical fuel cell comprising: providing an anode comprising a substantially solid cylindrical porous conductive matrix, said anode having an anode outer surface; intimately contacting a first proton exchange catalyst with said anode; conforming around and in intimate contact with said anode outer surface an inner polymer electrolyte membrane comprising a membrane outer surface and a membrane inner surface, wherein said membrane inner surface defines a tubular compartment and ionically communicates with said first proton exchange catalyst; providing a source of hydrogen gas in fluid communication with said first proton exchange catalyst; and, disposing around and in ionic communication with said membrane outer surface a cathode comprising a catalytically effective amount of a second proton exchange catalyst.

34 Claims, 4 Drawing Sheets

CYLINDRICAL PROTON EXCHANGE MEMBRANE FUEL CELLS AND METHODS OF MAKING SAME

This application claims the benefit of Provisional Application Ser. No. 60/019,182, filed on Jun. 5, 1996.

FIELD OF THE INVENTION

The present invention relates to cylindrical proton exchange membrane (PEM) fuel cells and to methods of constructing cylindrical PEM fuel cells.

BACKGROUND OF THE INVENTION

Fuel cells combine hydrogen and oxygen without combustion to form water and to produce direct current electric power. The process can be described as electrolysis in reverse. Fuel cells have been pursued as a source of power for transportation because of their high energy efficiency (unmatched by heat engine cycles), their potential for fuel flexibility, and their extremely low emissions. Fuel cells have potential for stationary and vehicular power applications; however, the commercial viability of fuel cells for power generation in stationary and transportation applications depends upon solving a number of manufacturing, cost, and durability problems.

The most promising fuel cells for widespread transportation use are PEM fuel cells. PEM fuel cells operate at low temperatures, produce fast transient response, and have relatively high energy density compared to other fuel cell technologies. Any fuel cell design must: (a) allow for supply of the reactants (typically hydrogen and oxygen); (b) allow for mass transport of product (water) and inert gases (nitrogen and carbon dioxide from air); and (c) provide electrodes to support catalyst, collect electrical charge, and dissipate heat. Electrical and thermal resistance, reactant pressures, temperatures, surface area, catalyst availability, and geometry are the main factors affecting the performance and efficiency of a fuel cell.

Problems encountered with PEM fuel cells are the need to reduce thermal and mechanical stress concentrations and to increase integrity and performance. Current phosphoric acid and PEM fuel cells rely on flat-plate electrodes. Flat plate PEM fuel cells suffer from reactant flow distribution problems which can cause inefficient operation and even premature failure of the fuel cell.

Certain fuel cells—solid-oxide, ceramic, high-temperature fuel cells—have been described in tubular configurations. The use of tubular, or capillary PEM fuel cells could lead to lower thermal stress and reduced manufacturing costs. Unfortunately, solid-oxide cylindrical fuel cell construction, materials, and methods are not directly applicable to PEM fuel cells.

Simple methods are needed to manufacture cylindrical PEM fuel cells.

SUMMARY OF THE INVENTION

The present invention provides a method of manufacturing a cylindrical fuel cell comprising: providing an anode comprising a substantially solid cylindrical porous conductive matrix, said anode having an anode outer surface; intimately contacting a first proton exchange catalyst with said anode; conforming around and in intimate contact with said anode outer surface an inner polymer electrolyte membrane comprising a membrane outer surface and a membrane inner surface, wherein said membrane inner surface defines a tubular compartment and ionically communicates with said first proton exchange catalyst; providing a source of hydrogen gas in fluid communication with said first proton exchange catalyst; and, disposing around and in ionic communication with said membrane outer surface a cathode comprising a catalytically effective amount of a second proton exchange catalyst.

DETAILED DESCRIPTION OF THE INVENTION

According to the present invention, a cylindrical PEM fuel cell is manufactured using: (a) solution casting; (b) rolled sheet construction; (c) sputtering; (d) in situ casting using the electrodes as a mold for a precursor gel or solution of the solid polymer electrolyte membrane; or (e) tubular polymer electrolyte membrane(s) to result in a "sausage cell" construction. Substantially any gas diffusion electrodes may be used in the present invention as long as the electrodes either are commercially available in cylindrical form, or may be converted or "packed" into cylindrical form. The electrode formed from the material should resist corrosion in an acid environment, offer good electrical conductivity, allow fast permeation of oxygen (cathode) and hydrogen (anode), comply with thin layer manufacturing techniques, and contribute little to the weight and cost of the fuel cell assembly. Stainless steel and carbon are preferred materials, and suitable versions of such materials include, but are not necessarily limited to, graphite, carbon fiber, carbon cloth, and stainless steel cloth. Preferred electrodes are as thin as possible, typically having a thickness between about 0.010–0.175 inches, and have two different diameters, one diameter being between about 5–7 mils smaller than the other diameter.

Suitable electrodes are available from a number of known commercial sources and include, but are not necessarily limited to: carbon gas diffusion electrodes; iso-molded graphite; carbon bundles, preferably having 6,000 or 12,000 carbon filaments/bundle; reticulated carbon; carbon cloth; sintered stainless steel; stainless steel cloth or mesh; and, carbon paper. Catalyzing and wet-proofing are required before using these electrode materials.

Solution Casting

Figure 1:
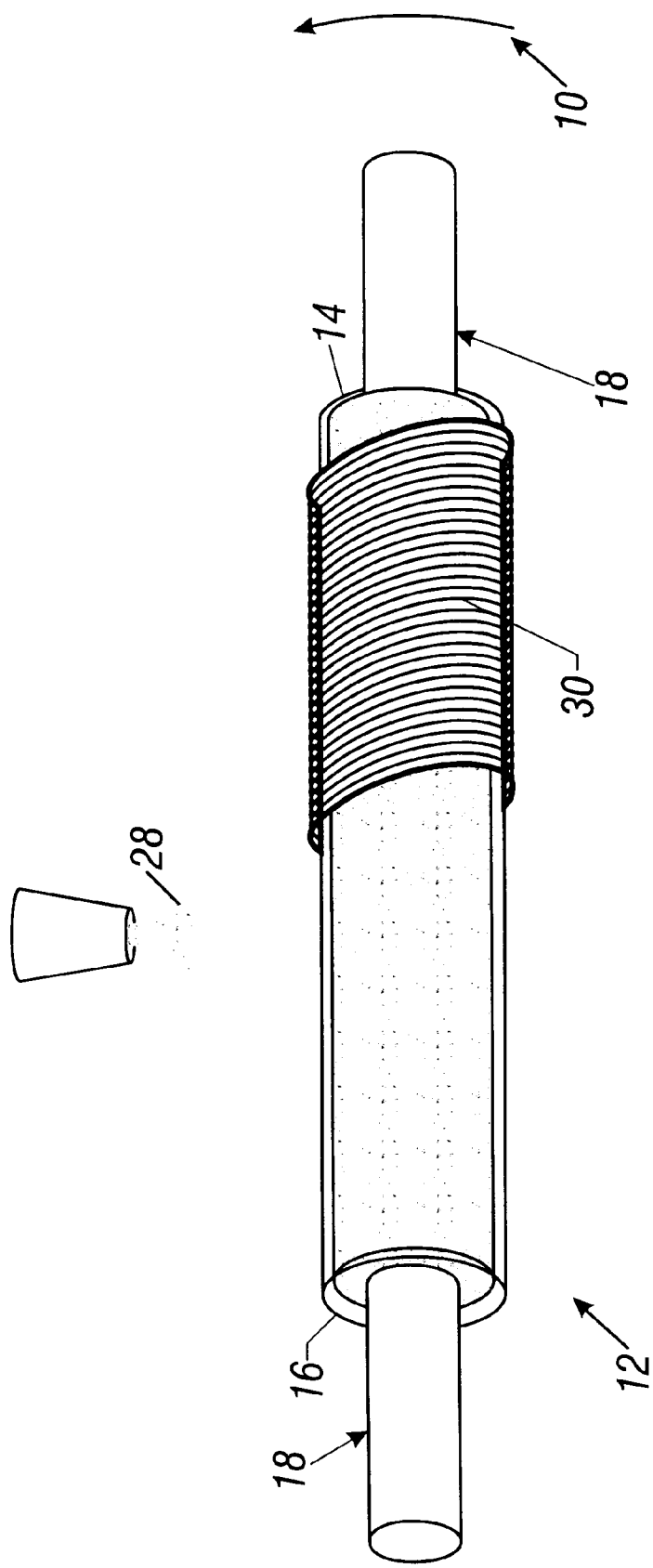
FIG. 1 is a schematic depiction of graphite core solution casting of a cylindrical PEM fuel cell according to the present invention.

Solution casting of the polymer electrolyte membrane on a graphite core is illustrated in FIG. 1. Application of materials preferably should be with the assistance of a lathe 10. The rotation rate of the lathe 10 preferably should be very slow to allow controlled application of low viscosity solutions.

An inner electrode 12, preferably a porous, molded or machined, graphite cylindrical electrode having opposed ends 14, 16, should be supported at each end 14, 16 by the lathe 10 using fittings 18 (such as glass rods) on each end.

A solution containing desired catalyst(s) should be prepared to deposit catalyst particles onto the electrode surface.

The solution preferably should comprise (a) desired catalysts, preferably on carbon slurried in water, mixed with (b) an ionomer solution in an appropriate solvent.

Suitable catalysts include noble metal catalysts, such as platinum, gold, silver, palladium, ruthenium, rhodium, and iridium. A preferred catalyst is platinum black on carbon. Experimental results indicate that platinum, or a suitable substitute, must be present as a catalyst in order for the fuel cell of the present invention to operate.

Suitable ionomers include, but are not necessarily limited to the NAFION products available from Dupont, the developmental Dow membrane materials available from Dow Chemical Co., the Gore-Select™ materials available from W.L. Gore & Associates, Inc. A preferred ionomer is 5% NAFION dissolved in methanol and water, available from Aldrich Chemical Co.

Suitable solvents for the ionomer include, but are not necessarily limited to, organic alcohols, with or without water, such as methanol and water, ethanol, etc.

In a preferred embodiment, a solution of 20 wt % platinum on carbon slurried in water is used. A preferred solution may be formed by slurrying between about 0.03–0.04 g of 20 wt % Pt on carbon in about 0.5 mL of water; adding 2.0 mL of methanol to 2.5 mL of 5% NAFION solution; combining the platinum/carbon slurry with the methanol/NAFION solution; and sonicating the mixture for approximately one hour.

In order to form the catalyst layer, the catalyst solution should be applied, preferably dropwise, to the outside of the inner electrode 12 to a thickness of between about 0.001–0.003 inches. The inner electrode 12 then may be dried. If rapid drying is desirable, a heat gun may be used until the inner electrode 12 is dry to the touch.

Thereafter, the solid polymer electrolyte membrane layer is formed by applying a sufficient amount of a stock ionomer solution 28, preferably NAFION solution (5%-Aldrich), preferably dropwise, to the outside of the inner electrode 12 to achieve a thickness of between about 0.003–0.010 inches. In a preferred method, the ionomer solution is applied in small increments with some intermittent partial heat gun drying. After the entire volume of ionomer solution has been applied, the assembly should be dried until tack free.

An outer catalyst layer then should be formed using the same procedures described above for the inner catalyst layer. The catalyst-containing solution already described should be applied, preferably dropwise, to the outside of the outer electrode 30 to a thickness of between about 0.001–0.003 inches. Thereafter, an outer electrode 30, preferably a carbon fiber tow, should be wound around the assembly very carefully without contacting the uncoated portions of the inner electrode. The assembly then may be dried, preferably with a heat gun, until tack free. The assembly also preferably should be oven dried, e.g., by placing the assembly in a 60° C. (140° F.) oven overnight, in order to thoroughly dry the materials. It is particularly important to evaporate all of the solvent, preferably methanol, from the NAFION solution to ensure that the cast polymer electrolytic membrane layer is completely formed.

After cooling, and when ready for use, the assembly should be rinsed, e.g., by filling and then immersing the assembly in distilled water. Afterwards, the wet assembly should be leak tested with pressurized air. Electrical resistance testing also should be performed.

Rolled Sheet Construction

An alternate method for manufacturing a cylindrical fuel cell according to the present invention is rolled sheet construction, in which flat electrode and membrane sheet materials are used. In this approach, commercially available catalyst-coated carbon cloth and NAFION membrane sheet materials may be used. The challenge of this type of construction is to form an intimate connection between the layers and to seal the longitudinal seams of the cell.

Figure 2:
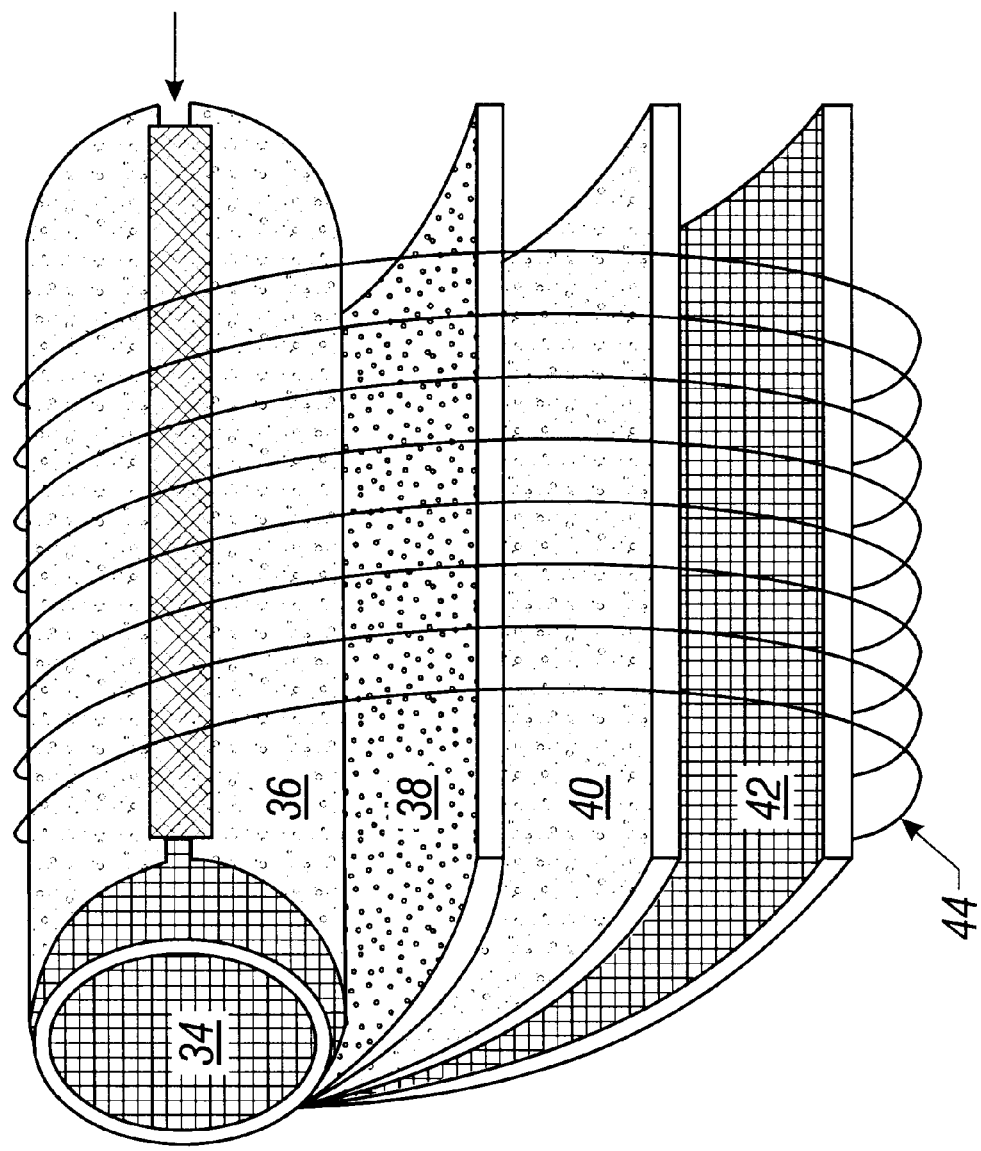
FIG. 2 is a schematic depiction of rolled sheet construction of a cylindrical PEM fuel cell according to the present invention.

Each fuel cell should be assembled using five layers, as shown in FIG. 2. The first and innermost layer 34 preferably is a stainless steel screen or cloth which has been welded or otherwise converted into a cylindrical shape. This innermost layer 34 serves as the electrical current collector, and it is important to establish good contact between the innermost layer 34 and the second layer 36, which is the anode of the fuel cell.

Substantially any gas diffusion electrode may be used as the second layer 36 as long as the electrode resists corrosion in an acid environment, offers good electrical conductivity, allows fast permeation of hydrogen, and contributes little to the weight and cost of the fuel cell assembly. Suitable materials include, but are not necessarily limited to, graphite, carbon fiber, carbon cloth, and stainless steel cloth. A preferred material for the second layer 36, or anode, is a carbon cloth doped with carbon black, such as VULCAN XC-72™ (available from E-TEK, Natick, Mass.) loaded at 4–5 mg/cm$^2$, and platinum black catalyst loaded at 0.4 mg/cm$^2$. The carbon cloth also should be additionally treated with a chemical casting of TEFLON to provide a hydrophobic layer to prevent water from blocking the active areas of the fuel cell.

The third layer 38 is the solid polymer electrolyte membrane. A preferred material is Dupont's experimental NAFION 115™. The Dupont material is a perfluorinated sulfonic acid membrane that comprises 5 mils of tetrafluoroethylene and perfluorinated monomers containing sulfonic or carboxylic acid groups. An unfortunate property of the material is that it changes dimensions based on moisture content; however, the material must be completely hydrated in order to function. Therefore, it is important to form the cylindrical NAFION membrane tightly around the first two layers. This may be accomplished by sealing the NAFION membrane to itself using a narrow strip of 3M fiberglass adhesive tape. This tape has proven capable of withstanding the wet, acidic environment.

The fourth layer 40 is the cathode, which may be formed in the same manner as the anode 36. Both the anode 36 and the cathode 40 should be permeable to oxygen and water. The fifth layer 42 acts as a current collector for the cathode 40. The fifth layer 42 preferably comprises a stainless steel cloth around which is tightly wound a stainless steel wire 44. The stainless steel wire 44, acts like the whipping on a rope, providing (a) structural support and better contact between the fuel cell layers, and (b) a positive electrical connection for the external load.

Sputtering

Alternately, the electrode, catalyst, and support materials may be applied to the PEM or the electrode using a low-temperature, low pressure, high vacuum sputter-deposition method. The PEM or the electrode should be placed in a vacuum of between about $1.0\times10^{-5}$–$1.0\times10^{-4}$ torr, preferably about $5.5\times10^{-5}$ torr, and each side of the material, preferably a NAFION 115 membrane or E-TEK carbon cloth, should be exposed to simultaneous sputtering of carbon and platinum at an energy of between about 6–10 keV, preferably about 8 keV. The carbon deposition rate should be approximately ten times the deposition rate of the platinum. Deposition rates may be calibrated using the instrument's quartz crystal monitor. Preferably, the sputtering should be continued until the PEM contains between about 100–200 nm, preferably about 200 nm, of the sputtered materials on each side. A suitable instrument for such sputtering is an IBS/TM200S, made by VCR Group Incorporated.

This approach applies the electrode and catalyst materials directly to the membrane or electrode so that the ionic/electronic interface is continuous. Unfortunately, many of the available instruments for low-temperature sputtering can not handle sample areas larger than about one square inch without extensive modifications. However, a large surface modification/ion implantation system is commercially available for use at Southwest Research Institute, San Antonio, Tex.

In Situ extrusion casting using electrodes as a mold

Using this casting method, the current-carrying electrodes form the inner and outer walls of a mold for extrusion casting of the solid polymer electrolyte membrane. Preferred electrodes for use in this method are molded graphite cylindrical electrodes treated with TEFLON. Catalyst particles may be deposited on the inside surface of the outer electrode and on the outside surface of the inner electrode using any suitable procedure. A preferred procedure is sputtering, as described above. Deposition of the catalyst should be done in advance of the membrane casting process.

Figure 3:
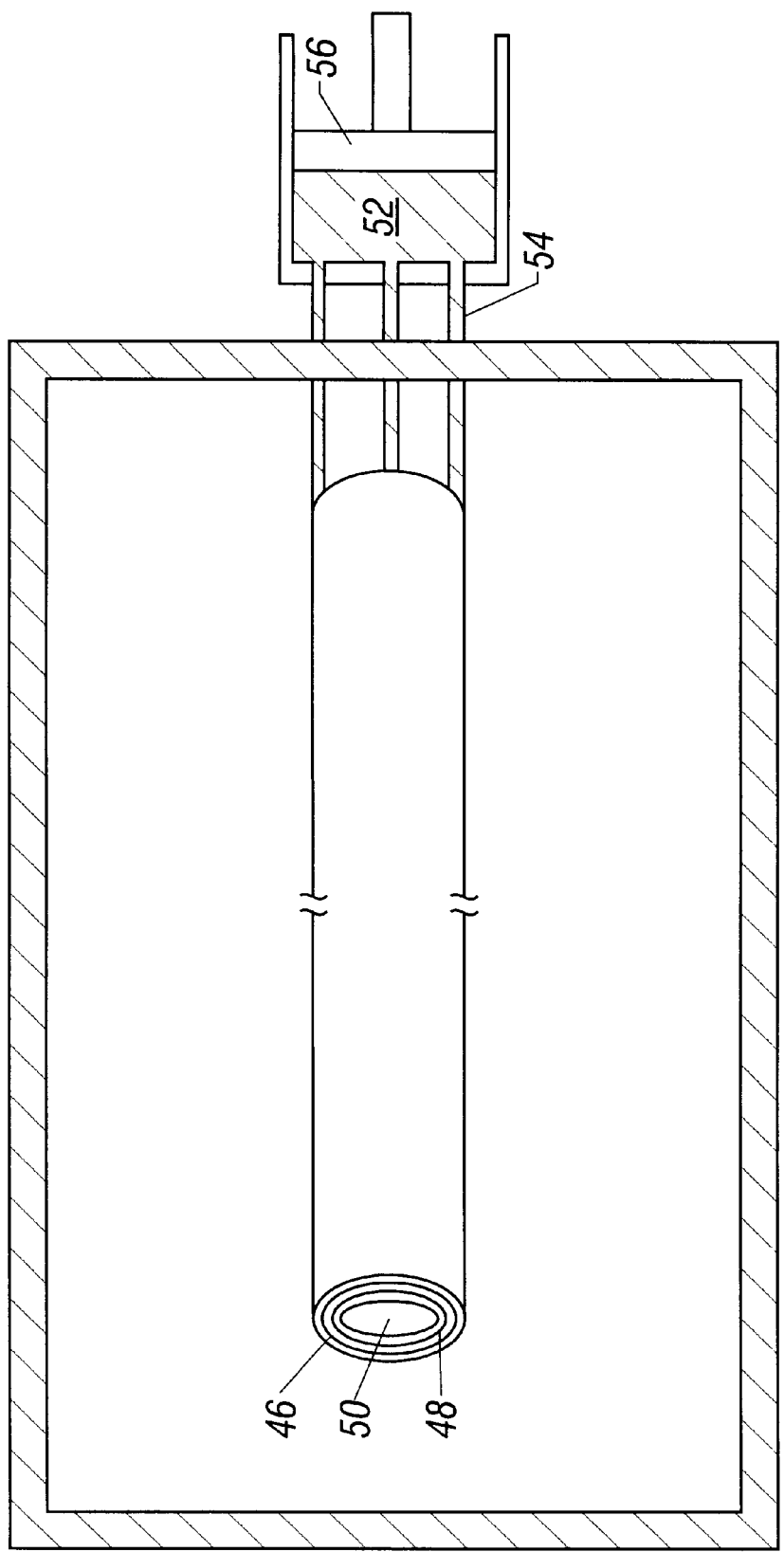
FIG. 3 is a schematic depiction of in situ casting using the electrodes as a mold according to the present invention.

Thereafter, the electrodes should be oriented concentrically, in a manner similar to that shown in FIG. 3. Referring to FIG. 3, the electrodes 46, 48 should be equally spaced between about 5–10 mils apart, preferably between about 5–7 mils apart, and supported at the top and/or bottom, or both, during the casting or molding process. In a preferred embodiment, the electrodes are supported by grooved plates to assure the fixed and uni-axial spacing of the cylinder walls.

The exposed electrode walls preferably should be supported to prevent outward or inward deformation. The outer electrode may be supported, for example, by surrounding the outside wall of the electrode 46 with a cylindrical mesh, preferably of stainless steel. The inner electrode 48 also may be supported by surrounding the inside wall of the electrode with a cylindrical mesh, preferably made of stainless steel, or by inserting a suitably sized perforated die into the bore 50 formed by the inner electrode. Support structures preferably should be porous to allow for effective application of a vacuum while the membrane solution is injected, thus avoiding air gaps in the mold.

Once the catalyst has been deposited, the supported electrode assembly should be maintained in the vacuum and a gel or solution of polymer electrolytic membrane material 52 should be forced between the electrodes 46, 48. Suitable materials, again, are ionomers, most preferably a NAFION solution (5%-Aldrich). The membrane material may be forced between the electrodes using any suitable method. In a preferred embodiment, the membrane material 52 is forced through an injection manifold 54 using a plunger 56.

Once the membrane material 52 has filled the mold, the membrane material should be maintained in the vacuum until the vacuum pressure stabilizes. The long-term stabilization of vacuum pressure indicates that the membrane material is no longer emitting gas, and therefore that the membrane is cured.

If membrane curing is controlled in a dehumidified vacuum chamber, then the membrane should be held in compression by the electrodes because the membrane will swell as it is later hydrated. This strategy ensures that good contact between electrode, catalyst, and membrane interfaces will be formed.

This in situ method of casting saves a step in construction by creating the fuel cell interface during formation of the membrane. Also, a thicker interface layer can be formed, which uses the catalyst material more efficiently. Furthermore, using the electrodes as the mold for the membrane assures intimate contact between the electrodes and the membrane in the final product.

Sausage Cell

In a "sausage cell," a hollow or tubular polymer electrolyte membrane (PEM) is used as an outer "sausage"-type casing forming an enclosed area filled with a gas diffusion electrode.

Ionomer membranes are commercially available in tubular form from Perma Pure, Inc., Tom's River, N.J. A preferred commercially available tubular ionomer is NAFION tubing from Perma Pure, Inc. having a thickness of 0.13 mm or less, preferably about 0.09 mm. The inner diameter should be sized to fit tightly around the anode upon shrink fitting. Tubular NAFION tubing is available from Perma Pure with an inner diameter of up to about 2.16 mm.

Substantially any gas diffusion electrode material may be used as long as the electrodes are commercially available as a suitably sized cylinder or in powder form. The electrode formed from the material should resist corrosion in an acid environment, offer good electrical conductivity, allow fast permeation of hydrogen or oxygen and contribute little to the weight and cost of the fuel cell assembly. Carbon rods or carbon powder are preferred materials.

The carbon acts as a conductor of electricity and constitutes a main current pathway in the complete fuel cell, connecting the inside of the fiber to the external load through convenient contacts in the fiber headers at each end. The carbon matrix should conform tightly to the interior of the PEM casing, either by forcing the PEM casing over a rigid carbon rod or by packing the PEM casing with carbon powder. Tight conformation assures good electrical connectivity with the inner surface. The carbon preferably should be porous and allow the free diffusion of hydrogen from one end of the tube to the other. Alternately, a longitudinal bore may be provided from one end of the carbon rod to the other. Good distribution of hydrogen is achieved without the need for convoluted and complex flow channels such as those normally sculpted into carbon current collectors in flat plate fuel cells. The carbon also functions as a mechanical support for the ionomer membrane. A preferred carbon conductor is a graphite rod with an outer diameter of between about 0.1–3 mm, preferably about 3 mm. Suitable carbon rods are available from numerous sources. The use of an anode that is a carbon rod or other "non-laminar" or substantially solid structure is advantageous because it can avoid the need for bulky end plates. The term "non-laminar" is hereby defined to mean not in the form of a sheet or plate of material.

The carbon rod should be catalyzed and wet-proofed before use. Suitable catalysts include noble metal catalysts, such as platinum, gold, silver, palladium, ruthenium, rhodium, and iridium. A preferred catalyst is platinum black on carbon. The catalyst may be deposited using any suitable means, including but not necessarily limited to solution casting onto the rod, sputtering onto the rod, or by simply mixing the catalyst with carbon powder. For a carbon rod, a preferred method is solution casting.

In a preferred embodiment, the ionomeric tubular "casing" is shrunk around a carbon rod so that the anode (carbon rod) is in intimate contact with the electrolyte membrane. Such shrink-fitting can be achieved by using the marked ability of ionomeric material, such as NAFION, to swell when wetted. The procedure is illustrated in the accompanying drawings. After the casing has been shrink-fitted over the rod, the outer surface of the casing also preferably should be catalyzed using suitable means, including but not necessarily limited to solution casting, sputtering, or surrounding the casing with a layer of catalyst mixed with carbon powder. The final assembly preferably should be oven dried, e.g., by placing the assembly in a 60° C. (140° F.) oven overnight, in order to thoroughly dry the materials. It is particularly important to evaporate all of the solvent, preferably methanol, from the NAFION solution to ensure that the cast polymer electrolytic membrane layer is completely formed.

After cooling, and when ready for use, the assembly should be rinsed, e.g., by filling and then immersing the assembly in distilled water. Afterwards, the wet assembly should be leak tested with pressurized air. Electrical resistance testing also should be performed.

FIG. 4 is a step-by-step illustration of a preferred method for manufacturing a fuel cell according to the present invention using a shrink-fitting tubular PEM membrane as a casing. FIG. 4a illustrates a carbon rod 10 after application of catalyst coating 12, preferably by sputtering, to form the anode. FIG. 4b illustrates the application of a contact 14 to the anode 12. A suitable anode contact 14, such as a wire, is preferably wound around the carbon rod 10 and a tubular contact segment 16 of shrink-fitting tubular PEM membrane which has been soaked in a suitable solvent, such as methanol, is concentrically fitted over the anode contact 14. The tubular contact segment 16 should be allowed to dry and shrink tightly onto the carbon rod 10 at considerable tension, holding the contact 14 tightly in place.

Referring to 4c, a sleeve 18 of ionomer material, sized for a close fit with the rod 10 when the sleeve 18 is wet, is soaked in a suitable solvent, such as methanol, and then fitted over the carbon rod 10 and at least a portion of the adjacent contact segment 16. The end 20 of the sleeve 18 opposite the contact segment 16 preferably should be closed or regulated by a valve. In a preferred embodiment, a catalytic coating then should be formed on the outside of the sleeve 18 using one of the methods described above. Alternately, a separate electrode may be provided, along with any conventional current collector.

Figure 4A:
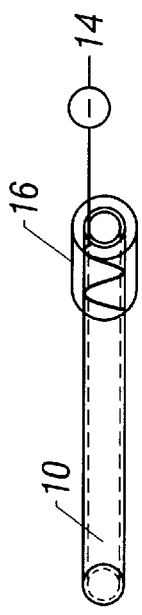
FIGS. 4a–4e are a step-by-step illustration of the manufacture of a "sausage cell" according to the present invention.
Figure 4B:
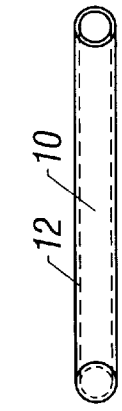
Figure 4C:
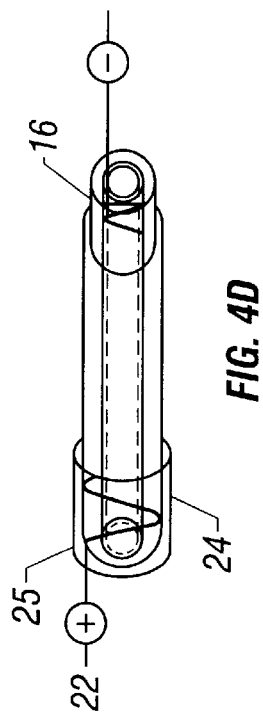
Figure 4D:
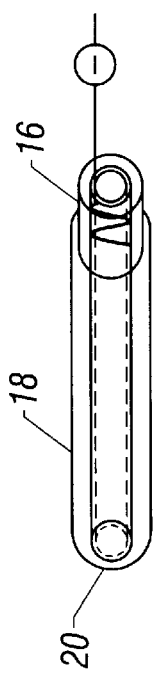

If the catalyst is applied directly to the sleeve, a suitable cathode contact, such as a wire 22, preferably is wound around the sleeve, as shown in FIG. 4d. A tubular contact segment 24 of ionomer membrane, preferably having a closed end 25, and sized to fit closely to the sleeve and carbon rod 10 when the contact segment 24 is wet, is concentrically positioned over the closed end 20 of the sleeve 18 and over the cathode contact 22. The closed tubular contact segment 24 is allowed to dry and shrink tightly onto the sleeve 18 at considerable tension, holding the contact 22 tightly in place. This method of shrink wrapping a carbon rod is advantageous because the ionomeric material must be completely hydrated in order to function. The ionomeric tube preferably should form a gas tight enclosed area connected to a source of humidified hydrogen under pressure.

Figure 4E:
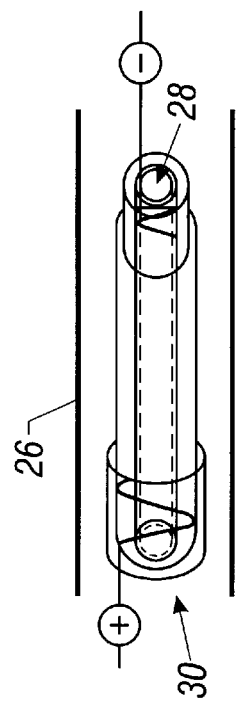

Referring now to FIG. 4e, the fuel cell should be provided with an outer sleeve or casing 26, made of any suitable material which preferably is gas tight and resistant to corrosion under the expected operating conditions, a preferred material being stainless steel. During operation, hydrogen 28 is fed to the carbon rod at a first pressure of between about 0–3 atm, preferably at about 3 atm or slightly lower, and oxygen is supplied to the annulus of the outer casing 26 at a second pressure of between about 0–3 atm, preferably at about 3 atm. The oxygen pressure should be higher than the hydrogen pressure in order to force the ionomer into contact with the carbon matrix.

When the hydrogen contacts the catalyst in the carbon matrix, or the catalyst coating 12 at the surface of the carbon rod 10, the molecules of hydrogen gas are decomposed into hydrogen atoms, which have their electrons stripped, resulting in the formation of $H^+$ ions. A continuous flow of H+ions thus penetrates the electrolytic layer of the sleeve 18 and contact segments 16, 24. Oxygen molecules from the feed 30 flow through the sleeve 18, and the catalyst coating 12 breaks down the oxygen gas molecules into oxygen atoms, which accept the electrons that have been stripped from the hydrogen atoms and react with the $H^+$ ions produced in the carbon matrix, forming water. If a separate electrode is used, the oxygen molecules are converted to oxygen atoms by the separate electrode.

In an alternate embodiment, powdered carbon, preferably VULCAN XC-72, a product which is produced by Cabot Corp., Tuscola, Ill., and which can be obtained from a number of distributors, such as E-TEK (Natick, Mass.), is mixed with between about 5–40 wt %, preferably about 10 wt % of a suitable powdered catalyst, preferably platinum. A smaller tubular NAFION membrane forms an inner compartment which is packed with the powder/catalyst mixture, preferably using a ASTM D-1319, incorporated herein by reference. The powder preferably should be packed loosely enough that hydrogen gas flows freely through the packed powder.

In order to form the cathode, a second tubular PEM membrane or sleeve having an inner diameter about 44% larger than the first membrane may be provided, and the annulus between the first membrane and the outer sleeve may be packed with the carbon/catalyst powder mixture.

In these embodiments, current collectors may be contacted with the cathode and the anode simply by extending a stainless steel wire through respective powder packing. Regardless of the embodiment, care should be taken not to contaminate the platinum catalyst with lead, for example, by using a lead-tin solder for sealing purposes. Lead is a well-known poison to platinum catalyst particles. The acidic environment of a hydrated NAFION membrane may allow lead to migrate within the cell. Without active platinum sites, the fuel cell will not operate.

The invention will be better understood with reference to the following examples:

EXAMPLE 1

In an effort to understand the physical requirements of cylindrical fuel cells before constructing them, calculations of chemical stoichiometry, fluid dynamics, and heat and mass transfer were performed. Design calculations covered a number of fuel cell sizes, air-to-fuel ratios, and electrical loads. Table 1 is a summary of the results of some of these calculations. The first column indicates the area of interest for each test case, or row in the table. The inner radius of the cell was varied from 0.09 cm to 1.25 cm to correspond to the size of a Perma Pure, NAFION-extruded capillary membrane and a readily-available, stainless-steel electrode, respectively, both of which were under consideration for the construction phase of the project.

TABLE 1

POWER AND HEAT TRANSFER CALCULATIONS OF CYLINDRICAL PEMFC (25 CM LENGTH)

| Experiment | IR, cm | OR, cm | MSA | Watts | Flow Rate, g/hr H$_2$ | Air | H$_2$O | Temp. Increase, °C @ 10 cm | @ 25 cm | Insul. Shell @ 25 cm |
|---|---|---|---|---|---|---|---|---|---|---|
| Base Case | 1.25 | 1.8 | 10 | 60 | 3 | 1130 | 27 | 45 | 110 | 196 |
| MSA | 1.25 | 1.8 | 30 | 60 | 3 | 3390 | 27 | 16 | 41 | 76 |
| Inner Radius | 0.09 | 1.8 | 10 | 5.2 | 0.3 | 98 | 2.3 | 44 | 98 | 200 |
| MSA Inner Radius | 0.09 | 1.8 | 30 | 5.2 | 0.3 | 294 | 2.3 | 16 | 38 | 74 |
| Inner Radius | 0.5 | 1.8 | 10 | 25 | 1.2 | 464 | 11 | 46 | 111 | 201 |
| MSA | 0.5 | 1.8 | 30 | 25 | 1.2 | 1394 | 11 | 16 | 41 | 75 |
| Max. Power | 1.25 | 1.8 | 30 | 110 | 7.5 | 8520 | 67 | 23 | 56 | 92 |
| Outer Radius | 1.25 | 22 | 10 | 60 | 3 | 1130 | 27 | 48 | 122 | 201 |
| MSA | 1.25 | 22 | 30 | 60 | 3 | 3390 | 27 | 16 | 42 | 77 |

Many assumptions were made to calculate the data tabulated above. The air and hydrogen flows were assumed dry, rather than humid. Calculations were not intended to provide a detailed model, rather they gave an idea of the effect of large changes in construction and operation of cylindrical fuel cells.

It appears from the calculations that the smaller the cell, the more difficult it will be to maintain the temperature at low levels. The most significant finding was that at least ten times the stoichiometric air flow was needed to prevent the temperature of the fuel cell from exceeding 71° C. (160° F.), when air, rather than water, was the sole source of cooling. In other words, the multiple of the stoichiometric air (MSA) required was greater than ten in order to use air cooling.

Table 1 shows results of operation at MSA equal to ten or thirty. The temperature data in the table is given as the temperature increase of the hydrogen gas at the center of the inner cylinder, from the inlet to a point ten centimeters downstream from the inlet. Temperature rise per unit length can be easily determined for a given configuration by using the tabulated data. Although the absolute maximum temperature for a PEMFC is 100° C. (212° F.) to avoid drying of the membrane, industry practice is to operate between 71–83° C. (160–180° F.).

Another important finding was that increasing the concentric outer cylinder radius from 1.8 to 22 cm had a relatively small effect on the heat transfer. This may have implications on the use of bundled tubular fuel cells in a large outer air conduit, much like a shell-and-tube heat exchanger.

It was concluded that geometry plays a key role in the design of a cylindrical fuel cell. Calculations of a surface-area-to-cell-volume ratio as an indication of use, along with the heat transfer coefficients, are useful for selecting an optimum geometry. Modeling showed that, with the range of geometries considered, between ten and thirty times the stoichiometric air flow is required on the cathode of the fuel cell to maintain correct operating temperatures using air, rather than water, as the coolant.

EXAMPLE 2

Solution cast cylindrical fuel cells (Prototypes 5–10 in Example 9) were made by applying catalyst and membrane material to a porous graphite rod or to a carbon sleeve as follows.

Where a porous graphite rod was used as the anode, the rod was either placed on a lathe or otherwise rotated during application of the solutions to ensure even application of the solutions. Where a carbon sleeve was used as an anode, the woven carbon sleeve was mounted onto a short piece of ¼" glass tubing. Approximately 2" of the sleeve was slipped over the tubing. "Five-minute" epoxy was used to securely fasten the carbon sleeve to the glass. The other end of the sleeve was prepared in the same way, except that the tubing was also closed at this end to terminate (dead head) the hollow core of the cylinder at the adhesion point. The epoxy was allowed to cure several hours. Prior to solution application, loose excess sleeve material extending along the glass rods on either end of the carbon sleeves was covered with TEFLON tape. A ⅛" glass rod served as a mandrel inserted down the open end of the carbon sleeve assemblies and through the sleeve to the dead head, to ensure the cavity remained cylindrical.

A catalyst-containing solution was prepared using 0.03–0.04 g of 20% Pt on carbon slurried in 0.5 mL of water. 2.0 mL of ethanol, used as a solvent, was added to 2.5 mL of 5% NAFION solution (from Aldrich). This mixture was then sonicated (mixed) for approximately one hour. The solution was applied dropwise to the graphite rods and the stretched carbon fiber sleeves. A total of 0.5 mL of the solution was applied between the two adhesion points of a first carbon sleeve prototype. A much thicker coating, with 2.5 mL of solution, was applied on the second carbon sleeve prototype. 2 mL of the solution was applied between the ends of the graphite rods. The solution was then dried with a heat-gun until dry to the touch. A preferred method for a applying these NAFION catalyst and membrane solutions is to apply a total of about 2 mL of solution in approximately 10 increments, drying each increment until dry to the touch before applying the next increment.

NAFION solution (5%-Aldrich) was then applied dropwise to the assemblies, making sure to continue the coating up to and including the adhesion areas of the carbon sleeves. A total of 2.0 mL of solution was applied in approximately 10 increments with some intermittent partial heat-gun drying. After the entire volume had been applied, the assembly was dried until tack free.

The cathode then was formed. For Prototypes 5 and 6, a second woven carbon sleeve was slipped over the assembly to form the cathode. Some snagging occurred. The sleeve was pulled taut and sealed to the assembly in the same manner as the first sleeve. The adhesion points were directly on top of the first set. The epoxy was allowed to set. For Prototypes 7 and 8, a carbon filament was wound around the assembly to form the cathode. In Prototype No. 9, stainless steel wire was wound around the assembly. In Prototype No. 10, the assembly was inserted into a porous graphite cylinder.

The catalyst-containing solution produced as described above was applied dropwise to the outer surface of the assemblies. In Prototype No. 10, the catalyst-containing solution was applied before insertion of the assembly into the porous graphite cylinder. A total of 2.0 mL was applied between ends or adhesion points in approximately 10 incremental applications with at least partial drying of increments. The assemblies then were completely dried with a heat gun until tack free. The assemblies were placed in a 60° C. oven overnight in order to thoroughly dry the materials.

After cooling, the inner support mandrel was removed from two of the carbon sleeve assemblies, and the assemblies were filled with, and then immersed in distilled water. Afterwards, the wet assemblies were leak tested with pressurized air. Water bubbles showed that the NAFION had not sealed all of the voids in the carbon fiber sleeves. Electrical measurement of resistance between the electrodes showed that the carbon fibers were probably protruding through the NAFION membrane, effectively short-circuiting the fuel cell. The resistance between the electrodes was only three ohms.

EXAMPLE 3

In an effort to avoid the snags, leaks, and shorts of carbon fiber sleeve assemblies of Example 2, a thicker coating of the polymer was applied. The procedures of Example 2 were used except that 5.0 ml of NAFION solution were used instead of 2.0 ml. Some increase in electrical resistance between the electrodes was observed.

EXAMPLE 4

Fuel cells were assembled using rolled sheet construction of five layers as shown in FIG. 2. A stainless steel screen or cloth was welded into a cylindrical shape for the first layer 34. The second layer 36 was either E-TEK carbon cloth (0.4 mg/cm$^2$ Pt on carbon) or a carbon cloth doped or undoped with carbon black (VULCAN XC-72) loaded at 4–5 mg cm$^{-2}$, and platinum black catalyst loaded at 0.4 mg cm$^{-2}$. On prototype units No. 3 and No. 4, the carbon cloth additionally was treated with a chemical casting of TEFLON to provide a hydrophobic layer to prevent water from blocking the active areas of the fuel cell. This fully treated material also was used to construct the fourth layer, the cathode, on all prototype units. The third layer 38 was 5 mils of Dupont's experimental NAFION 115, a perfluorinated sulfonic acid membrane obtained from Energy Partners. On one unit (Prototype 1), the membrane was rolled around a steel dowel and the edges were overlapped. A heat seal machine (see FIG. 6) was set for 300° C. (572° F.) and the specimen was held under pressure for 3 seconds. This process was very difficult to perform without damaging the thin membrane. Dimensional fitting was a problem because of the moisture response of the NAFION. On the subsequent units (Prototypes 2–4), NAFION was sealed using a narrow strip of 3M fiberglass adhesive tape. The tape proved to be capable of withstanding the wet, acidic environment.

The fifth layer 42 was fabricated by applying a stainless steel cloth followed by winding stainless steel wire 44 tightly around the assembly, like the whipping on a rope. The "whipping" acts as a structural support, to provide better contact between the fuel cell layers, and to provide an electrical connection for the external load.

EXAMPLE 5

Prototype 17 was made by placing a NAFION 115 membrane in a vacuum chamber equipped with an ion gun. The chamber was evacuated to a pressure of about $5.5 \times 10^{-5}$ torr. Both sides of the membrane were exposed to simultaneous sputtering of carbon and platinum at an energy of about 8 keV. The carbon deposition rate was approximately ten times the deposition rate of the platinum. The deposition rate was calibrated using the instrument's quartz crystal monitor. The sputtering was continued until the PEM contained about 200 nm, of the sputtered materials on each side.

The membrane then was assembled into a rolled sheet construction fuel cell in the manner described in Example 4.

EXAMPLE 6

Four "sausage cells" were made using as the anode porous graphite rods doped with catalyst either by solution casting (Prototype 12) or by sputter deposition (Prototypes 13–15). To sputter deposit the catalyst on the anode, 3mm carbon rods were placed in a vacuum of about $5.5 \times 10^{-5}$ torr and the surface of the rods were exposed to simultaneous sputtering of carbon and platinum at an energy of about 8 keV using an IBS/TM200S, made by VCR Group Incorporated. The deposition rates were calibrated using a quartz crystal monitor so that the carbon deposition rate was approximately ten times the deposition rate of the platinum. The sputtering was continued until the rods contained about 200 nm of the sputtered materials on their surface.

NAFION tubing having an inner diameter of about 2.16 mm obtained from Perma Pure, Inc. was soaked in methanol for expansion purposes and the carbon rods were inserted into the tubing for a tight fit. In two of the assemblies (Prototypes 12 and 13) ELAT/HL carbon cloth doped with platinum and TEFLON obtained from E-TEK, Inc. were wrapped around the rods and held in place by stainless steel wire. In two of the assemblies (Prototypes 14 and 15), catalyst was sputter deposited onto the outside of the tubular membrane, and stainless steel wire was wrapped around the assembly.

The cells using carbon cloth as the cathode were connected to the same hydrogen supply and both were mounted in the same glass vessel fed by a bottled air supply. Both cells exhibited open circuit voltage (OCV) before any gas was connected (cell A: 0.4 VOC, cell B: 0.2 VOC). To begin fueled experiments, the hydrogen side was evacuated with a diaphragm vacuum to remove trapped air. This caused a slight increase in voltage in both cells. When hydrogen and air were turned on, both cell voltages rose to approximately 0.75 VOC. The hydrogen then was modulated on and off.

The cell in which the anode catalyst had been sputter deposited exhibited a more dynamic OCV during the on and off periods with the hydrogen than the cell in which the anode catalyst had been solution cast. The OCV of the sputter deposited cell would increase/decrease as much as 5 times the magnitude of the OCV of the solution cast cell when the hydrogen was cycled on and off. Both cells ran for several hours at OCV between 0.7 and 0.8 VOC. Suddenly both cells quickly decayed to 0 VOC. Inspection revealed that the hydrogen lines were plugged with water. The water in the humidified gas condensed after it exited the heater tape of the humidifier causing the gas lines to become blocked. The lines were cleared of moisture, the evacuation procedure was repeated, and the cells were run again. The sputter deposited cell returned to previously seen voltages (0.7–0.8 VOC) while the solution cast cell peaked at less than 0.1 VOC and exhibited erratic operation. The foregoing indicated that solution casting was more promising than sputter coating when the anode is a carbon rod.

One of the cells in which the electrode was sputter coated directly on the outside of the NAFION tubing initially was soaked in deionized water to condition the membrane. The hydrogen was turned on to monitor reactivity while the conditioning was in process. While soaked in water, the OCV was less than 0.4 VOC. The cell was shorted a series of times and the voltage rose approximately 50% each time. Shorting of the cell was continued using water, and the voltage climbed to as much as 0.65 VOC. The voltage then fell to zero. When the cell was removed from the water the voltage came back up to about 0.65 VOC. This may indicate that all of the oxygen in the water had been consumed. Air was bubbled through the water, and an OCV of near 0.80 VOC was observed.

EXAMPLE 7

As a variant of the sausage cell, Prototype 16 used powdered carbon mixed with a platinum catalyst as the anode. Pelletized ten-percent platinum on Vulcan XC-72 is available from several suppliers. The tubular NAFION casing was filled with this powder using ASTM technique D1319, procedure 12.1, incorporated herein by reference, which requires an apparatus to vibrate the NAFION tube to allow the powder to pack tightly. To serve as a current collector, a stainless wire was placed inside before packing began. The cell could not be tested because a leak developed during the assembly process. Although it is a promising technique for small diameter, capillary-type cells, the porosity of the packing material must be enhanced.

EXAMPLE 8

Theoretical open circuit voltage (Et) was calculated for the 17 prototypes made in Examples 2–8 in two ways (rows 1 and 2 in the following Table) for comparison with experimental data. A flat PEM fuel cell also was constructed for test bench shakedown and baseline experiments. The cell was a 68 mm diameter assembly built to resemble state of the art flat fuel cells. Commercially available NAFION membrane and two carbon electrodes loaded with platinum at rates between 0.4 mg/cm$^2$ and 4.0 mg/cm$^2$ were cut and assembled into a sandwich. This membrane electrode sandwich was placed between two stacks of 100-mesh stainless steel screens. Once assembled, the membrane, electrodes and screens were compressed by bolting together two opposing, identical, stainless steel discs with a shallow dish machined for gas distribution across the faces of the anode and the cathode. The shallow dish was not unlike the bowls of engine pistons. Gas seals were made with TEFLON o-rings. Polarization curves of voltage versus load current—which is the industry standard method of characterizing a fuel cell—indicated the response of the fuel cell over a range of loads using component (membranes and electrodes) similar to the commercially available materials used for some of the cylindrical fuel cells. These results for these flat cells, shown in the following Table, were used for comparison with cylindrical cells.

| Fuel Cell Type | Case | Description | Volts (measured or calculated) |
|---|---|---|---|
| Theoretical | Et based on LHV of Hydrogen and Air | | 1.25 |
| Theoretical | Et based on 2nd Law Analysis | | 1.03 |
| Flat Cell | Assembly No. 1 | E-TEK 0.4 mg/cm$^2$ Pt on carbon | 0.95 |
| Flat Cell | Assembly No. 1 | E-TEK 0.4 mg/cm$^2$ Pt on carbon (after heat treat) | 0.95 |
| Flat Cell | Assembly No. 2 | EPI 4.0 mg/cm$^2$ Pt on carbon | 1.00 |

EXAMPLE 9

The open-circuit voltage (OCV) was measured for each of the 17 prototypes. The results are given in the following Table:

The rolled sheet prototypes (1–4 and 11) suffered from insufficient interface contact between layers. The first three solution cast prototypes (5–7) exhibited hydrogen leakage and the inner and outer electrodes were electrically shorted. The investigators believed that the problems were related to

| MEMBRANE CONSTRUCTION | PROTOTYPE | ELECTRODE CONSTRUCTION ANODE | CATHODE | OPEN CIRCUIT VOLTAGE |
|---|---|---|---|---|
| Heat Sealed Sheet | No. 1 | E-TEK carbon cloth (0.4 mg/cm$^2$ Pt on carbon) | Teflonized E-TEK carbon cloth (0.4 mg/cm$^2$ Pt on carbon) | 0.92 |
| Rolled Sheet | No. 2 | Carbon cloth with no catalyst | Teflonized carbon cloth (0.4 mg/cm$^2$ Pt on carbon) | 0.46 |
| Rolled Sheet | No. 3 | Teflonized carbon cloth (0.4 mg/cm$^2$ Pt on carbon); Lead solder may have poisoned the anode | Teflonized carbon cloth (0.4 mg/cm$^2$ Pt on carbon) | 0.73 |
| Rolled Sheet | No. 4 | Teflonized E-TEK (0.4 mg/cm$^2$ Pt on carbon); | Teflonized E-TEK (0.4 mg/cm$^2$ Pt on carbon) SS wire binding used for compression | 0.95 |
| Solution Cast | No. 5 | Carbon fiber sleeve with chemical cast Pt on carbon | Carbon fiber sleeve with chemical cast Pt on carbon | -0- |
| Solution Cast | No. 6 | Carbon fiber sleeve with chemical cast Pt on carbon | Carbon fiber sleeve with chemical cast Pt on carbon | -0- |
| Solution Cast | No. 7 | Porous graphite anode with chemical cast Pt on carbon | Carbon fiber filament binding and chemical cast Pt on carbon | -0- |
| Solution Cast | No. 8 | Ten parallel porous graphite cylinders with chemical cast Pt on carbon | Chemical cast Pt on carbon | -0- |
| Solution Cast | No. 9 | Six parallel porous graphite cylinders with chemical cast Pt on carbon | Chemical cast Pt on carbon and stainless wire current collectors | 0.68 (average of six) |

| MEMBRANE CONSTRUCTION | PROTOTYPE | ELECTRODE CONSTRUCTION ANODE | CATHODE | OPEN CIRCUIT VOLTAGE |
|---|---|---|---|---|
| Solution Cast | No. 10 | Porous graphite rod with chemical cast Pt on carbon | Porous graphite cylinder with chemical cast Pt on carbon anode and cathode were pre-fitted with conical lapping | -0- |
| Rolled Sheet | No. 11 | EPI membrane-electrode assembly with stainless screens and wire binding | EPI membrane-electrode assembly with stainless screens and wire binding | 1.10 |
| Extruded Tube | No. 12 | Porous graphite rod with solution cast Pt on carbon inserted in swelled NAFION tube | Formed by rolling ETEK carbon cloth over NAFION tube | 0.79 |
| Extruded Tube | No. 13 | Porous graphite rod with ion beam deposition inserted in swelled NAFION tube | Formed by rolling ETEK carbon cloth over NAFION tube | 0.76 |
| Extruded Tube | No. 14 | Porous graphite rod with ion beam deposition inserted in swelled NAFION tube | Ion deposition of Pt on carbon on outside of tube with stainless wire current collector | 0.80 |
| Extruded Tube | No. 15 | Porous graphite rod with ion beam deposition inserted in swelled NAFION tube | Ion deposition of Pt on carbon on outside of tube with stainless wire current collector | 0.76 |
| Extruded Tube | No. 16 | Vulcan XC-72R (carbon) powder mixed with Pt loaded carbon and packed into extruded NAFION tube | Formed by rolling ETEK carbon cloth over NAFION tube | -0- |
| Rolled Sheet | No. 17 | Sintered stainless steel cylinder wrapped with sputtered NAFION sheet | Sputtered NAFION with carbon fiber binding | 0.50 |

All cylindrical cells were tested with low-pressure (<10 in. H$_2$O) hydrogen and atmospheric air. Stainless steel cloth, formed into a cylindrical shape, was used as the inner and outer layers of the cell to provide electrical current conductors at each electrode.

the difficulty of building a thick coating of the NAFION, from a liquid solution, when it is applied to the extremely porous carbon fiber sleeve (Prototype Nos. 5 and 6) or the porous graphite (Prototype Nos. 7, 8, 9, and 10).

Prototype Nos. 8 and 9 were multi-cylinder fuel cell batteries. No. 8 was a 10-cylinder unit made from 1 in. by ⅛ in. diameter graphite rods. This unit suffered from inadequate membrane thickness. Using larger, 1 in. by ¼ in. graphite rods, and more solution layers, a six-cylinder unit was made as Prototype No. 9. The average open-circuit voltage of the six (6) cylindrical cells of Prototype No. 9 was 0.68 V. The open-circuit voltage for Prototype No. 9 shows that the prototype had internal short circuits caused by discontinuities in the casting; however, Prototype 9 was a functional fuel cell.

Of the five techniques used to construct the cylindrical fuel cells, solution casting and sausage packing were the most successful. More robust layer depositing techniques would be desirable for solution casting, but solution casting is very promising because of the high interface contact and low thicknesses involved. Extruded or tubular membranes also look promising as robust and effective materials for cylindrical fuel cells.

Gas diffusion appears to suffer somewhat when sputter and beam deposition techniques are used to apply carbon and platinum to fuel cell membranes and electrodes. However, ion-beam deposited and sputtered coatings may be effective on electrodes and as barriers on corrosion-prone materials, such as aluminum, which are desirable as replacements for stainless steel in fuel cells.

EXAMPLE 10

Atomic Force Microscopy (AFM), Scanning Electron Microscopy (SEM), and Transmission Electron Microscopy (TEM) studies of fuel cell membrane electrode materials and assemblies were conducted. The objective of these analyses was to investigate the carbon-platinum to polymer membrane interface properties. Interface thickness, morphology, and platinum distribution were characterized in the experiments. These characteristics influence the active area, electrical conductivity, porosity, and reactivity of the electrode.

AFM was performed on a NAFION film sputter coated with a 50 nm thick layer of a mixture of 10% Pt and 90% carbon. For correlation, AFM also was performed on an uncoated NAFION membrane. The microscopy was performed using a Digital Instruments Nanoscope II Scanning Probe microscope. All of the work was performed in air and in contact mode scanning.

Scanning of the Pt/C coated NAFION revealed a pebble-like structure of lateral dimensions on the order of about 100 to 300 nanometers. Vertical height differentials of the "pebbles" ranged from 1 nanometer to about 40 nanometers. These dimensions were observed in a scan frame of 3 microns by 3 microns. The surface was quite flat, with the maximum observed vertical differential being about 0.013 of the scan size. A complex web of crack-like features, roughly rhombic in shape, extended across all of the images. These crack-like features are reminiscent of grain boundaries found in polycrystalline materials, and are about 2 to 5 microns in lateral dimension. Crack-like features also were observed with SEM. These crack-like features most likely are the result of residual stresses accumulated and relieved during the sputtered film growth, or of mechanical stresses induced by handling of the NAFION membrane subsequent to sputter coating.

The uncoated NAFION membrane was imaged using the same AFM techniques as were used on the coated membranes. The images had a streaked, blurred appearance coaxial to the fast (x) scan direction. This poor resolution is typical of a soft polymer imaged with contacting-mode AFM. The coated NAFION did not display this characteristic. It was inferred that the 50 nm thick Pt/C coating is relatively hard, that the Pt/C coating uniformly covers the NAFION surface, and that the Pt/C coating does not deform or transmit much deformation to the underlying NAFION substrate. No web of crack-like features was observed on the uncoated NAFION, and the roughness seemed to be less than that of the coated material; however, the absence of such features may be the result of the softer, higher compliance material being "flattened" during scanning.

SEM and TEM analyses were conducted on a 200 nm ion sputtered Pt/C layer and a high performance fuel cell material from Energy Partners Incorporated (EPI). In both cases, the substrate was NAFION polymer membrane. The objective of these measurements was to determine the effect of the electrode deposition process on the structure and performance of the interface.

In the SEM micrographs, the sputtered coating appeared to be quite smooth but exhibited a fine dispersion of cracks, as discussed above. The lack of spallation, however, indicated that the material was well adhered to the substrate. The EPI-coating appeared to be much more porous in nature than the sputtered interface.

In order to compare the thickness of each coating, TEM cross sections were prepared by encapsulating small slivers of each material in epoxy. The capsules then were microtomed in 10 micrometer slices. When viewed in transmission, the sputtered membrane appeared as a thin dense layer with a thickness consistent with the predicted value of 0.2 micrometer based on the amount of sputtered material deposited. The agreement of this prediction with experimental results indicates that the deposited material formed a continuous, void-free layer on the membrane.

A darkly contrasting layer compared to the surrounding polymeric material was revealed, suggesting that a high Z material, presumably platinum, was uniformly dispersed throughout the layer. Subsequent analysis using energy dispersive spectrometry confirmed this hypothesis. TEM of the EPI membrane revealed that the electrode layer was much thicker—approximately 25 micrometer—with the platinum dispersed in small clusters. The impregnated epoxy also appeared to have diffused into the coating, causing the coating to artificially delaminate from the membrane.

Clearly, SEM and TEM a re effective in distinguishing differences in electrode structure. Based on these results, the behavior of the two electrode materials would be expected to differ significantly. The porous structure of the EPI material should result in improved gas diffusion, flow, and larger exposed platinum-carbon electrode surface area. The sputtered material shows a thin, dense, structure of finely dispersed particles. The EPI material should have advantages for gas diffusion and output current density. The EPI coating also may be an effective barrier on corrosive materials, such as aluminum, which are desirable for use in fuel cells to replace stainless steel.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

We claim:

1. A method of manufacturing a cylindrical fuel cell comprising:

providing an anode comprising an anode outer surface, a non-laminar substantially cylindrical porous conductive matrix, and a catalytically effective amount of a first proton exchange catalyst in ionic communication with said anode outer surface;

providing fluid communication between said anode and a source of hydrogen gas, wherein said anode is sufficiently porous for effective fluid communication between said hydrogen gas and said first proton exchange catalyst;

conforming around and in intimate contact with said anode outer surface an inner polymer electrolyte membrane comprising a membrane outer surface and a membrane inner surface, wherein said membrane inner surface defines a tubular compartment and ionically communicates with said first proton exchange catalyst; and disposing around and in ionic communication with said membrane outer surface a cathode comprising a catalytically effective amount of a second proton exchange catalyst in fluid communication with a source of gas comprising oxygen molecules.

2. The method of claim 1 further comprising contacting a first current collector with said anode;

contacting a second current collector with said cathode.

3. The method of claim 2 wherein said contacting said first current collector with said anode comprises securing said first current collector in contact with said anode by shrink fitting around said anode and said current collector a securing agent selected from the group consisting of said inner polymer electrolyte membrane and a separate tubular segment of a polymer electrolyte membrane.

4. The method of claim 3 wherein said anode comprises a substantially cylindrical porous conductive rod.

5. The method of claim 1 wherein said disposing around and in ionic communication with said membrane outer surface a cathode comprising a catalytically effective amount of a second proton exchange catalyst in fluid communication with a source of gas comprising oxygen molecules comprises disposing said cylindrical fuel cell concentrically within an outer sleeve which is in fluid communication with a source of gas comprising oxygen molecules.

6. The method of claim 5 wherein said conforming around said anode outer surface an inner polymer electrolyte membrane comprises forming said inner polymer electrolyte membrane at said anode outer surface by a method selected from the group consisting of:

solution casting, wherein a solution comprising said polymer electrolyte is applied to said anode outer surface and cured; and extrusion molding, wherein said cathode comprises a rigid cylinder of conductive material which, when concentrically positioned around said anode, forms an annular space into which a solution comprising said polymer electrolyte is extruded and cured.

7. The method of claim 5 wherein said disposing said cylindrical fuel cell concentrically within an outer sleeve which is in fluid communication with a source of gas comprising oxygen molecules comprises shrink fitting an outer polymer electrolyte membrane over said cylindrical fuel cell.

8. The method of claim 1 wherein said conforming around said anode outer surface an inner polymer electrolyte membrane comprises forming said polymer electrolyte membrane at said anode outer surface by a method selected from the group consisting of solution casting, wherein a solution comprising said polymer electrolyte is applied to said anode outer surface and cured; and extrusion molding, wherein said cathode comprises a rigid cylinder of conductive material which, when concentrically positioned around said anode, forms an annular space into which a solution comprising said polymer electrolyte is extruded and cured.

9. The method of claim 3 wherein said anode comprises a substantially cylindrical porous conductive rod.

10. The method of claim 1 wherein said inner polymer electrolyte membrane comprises a tubule comprising a closed end; and said anode comprises a powder comprising a mixture of carbon and said first proton exchange catalyst packed into a said tubule to form said non-laminar substantially cylindrical porous conductive matrix.

11. The method of claim 1 wherein said inner polymer electrolyte membrane is selected from the group consisting of a tubular membrane and a membrane sheet secured in tubular form; and, said providing a cylindrical anode comprising a substantially cylindrical porous conductive matrix and intimately contacting a first proton exchange catalyst with said anode comprises sputter depositing onto said inner membrane surface a mixture comprising said conductive matrix and said proton exchange catalyst.

12. The method of claim 11 wherein said disposing around and in ionic communication with said membrane outer surface a cathode comprising a catalytically effective amount of a second proton exchange catalyst comprises sputter depositing onto said membrane outer surface a mixture comprising a second conductive matrix and said second proton exchange catalyst.

13. A method of manufacturing a cylindrical fuel cell comprising:

providing an anode comprising a substantially cylindrical non-laminar porous conductive rod comprising an anode outer surface comprising a catalytically effective amount of a first proton exchange catalyst;

providing fluid communication between said anode and a source of hydrogen gas, wherein said anode is sufficiently porous for effective fluid communication between said hydrogen gas and said first proton exchange catalyst;

conforming around said anode an inner polymer electrolyte membrane comprising a membrane outer surface and a membrane inner surface, wherein said membrane inner surface defines a tubular compartment and ionically communicates with said first proton exchange catalyst; and disposing around and in ionic communication with said membrane outer surface a cathode comprising a catalytically effective amount of a second proton exchange catalyst in fluid communication with a source of gas comprising oxygen molecules.

14. The method of claim 13 further comprising contacting a first current collector with said anode;

contacting a second current collector with said cathode.

15. The method of claim 13 wherein said conforming around said anode outer surface an inner polymer electrolyte membrane comprises wrapping a first sheet comprising said polymer electrolyte membrane in a radial direction around a circumference of said cylindrical porous rod; and, securing said first sheet in a cylindrical configuration in intimate contact with said anode outer surface.

16. The method of claim 15 wherein said disposing around and in ionic communication with said membrane outer surface a cathode comprising a second proton exchange catalyst comprises
    wrapping a second sheet of catalyst-doped cathode material around said membrane outer surface; and,
    securing said second sheet in a cylindrical configuration around said membrane outer surface.

17. The method of claim 13 wherein said disposing around and in ionic communication with said membrane outer surface a cathode comprising a catalytically effective amount of a second proton exchange catalyst comprises
    wrapping a sheet comprising catalyst-doped cathode material in a radial direction around a circumference of said membrane outer surface; and
    securing said second sheet in a cylindrical configuration around said membrane outer surface.

18. The method of claim 13 wherein said providing an anode comprising a substantially cylindrical porous conductive rod having an anode outer surface comprising a catalytically effective amount of a first proton exchange catalyst comprises applying a solution comprising said first proton exchange catalyst and said polymer electrolyte to said anode outer surface under conditions effective to form a first catalyst coating which adheres to said anode outer surface after drying.

19. The method of claim 18 wherein said conforming around said anode outer surface an inner polymer electrolyte membrane comprises applying to said anode outer surface a solution comprising said polymer electrolyte under conditions effective to form an inner polymer electrolyte membrane which adheres to said first catalyst coating after drying.

20. The method of claim 19 wherein said disposing around and in ionic communication with said membrane outer surface a catalytically effective amount of a second proton exchange catalyst comprises applying a solution to said membrane outer surface comprising said second proton exchange catalyst and said polymer electrolyte under conditions effective to form a second catalyst coating which adheres to said membrane outer surface after drying.

21. The method of claim 13 wherein
    said first proton exchange catalyst is deposited onto said anode outer surface;
    said disposing around and in ionic communication with said membrane outer surface a cathode comprising a catalytically effective amount of a second proton exchange catalyst comprises:
        providing a cathode comprising a rigid annular conductive matrix comprising an annular cathode inner surface;
        depositing said second proton exchange catalyst onto said annular cathode inner surface;
        positioning said anode and said membrane outer surface concentrically within said annular cathode inner surface; and
    said conforming around said anode outer surface an inner polymer electrolyte membrane comprises:
        extruding a solution comprising said polymer electrolyte into an annular bore formed between said anode outer surface and said annular cathode inner surface; and,
        curing said solution.

22. The method of claim 21 wherein said depositing said first proton exchange catalyst onto said anode outer surface comprises sputter depositing said first proton exchange catalyst onto said anode outer surface.

23. The method of claim 22 wherein said depositing said second proton exchange catalyst onto said cathode inner surface comprises sputter depositing said second proton exchange catalyst onto said cathode inner surface.

24. A cylindrical fuel cell comprising:
    an anode comprising a substantially solid cylindrical porous conductive matrix comprising an anode outer surface and comprising sufficient porosity for effective fluid communication between hydrogen gas and a first proton exchange catalyst;
    an inner tubular polymer electrolyte membrane defining an inner compartment and comprising a membrane inner surface and a membrane outer surface, said anode being disposed concentrically within said inner compartment;
    said first proton exchange catalyst being in ionic communication with said anode and with said membrane inner surface;
    a first inlet for a source of gas comprising hydrogen molecules, said first inlet being in fluid communication with said first proton exchange catalyst via said porosity through said anode; and
    a cathode comprising a second proton exchange catalyst, said second proton exchange catalyst being in ionic communication with said membrane outer surface and in fluid communication with a source of gas comprising oxygen molecules.

25. The cylindrical fuel cell of claim 24 further comprising
    a first current collector in electrical communication with said anode; and
    a second current collector in electrical communication with said cathode.

26. The cylindrical fuel cell of claim 24 disposed concentrically within an outer sleeve.

27. The cylindrical fuel cell of claim 26 wherein said outer sleeve comprises a gas impermeable conduit for said gas comprising oxygen molecules.

28. The cylindrical fuel cell of claim 26 wherein
    said outer sleeve comprises an outer polymer electrolyte membrane comprising an outer sleeve surface in fluid communication with said gas comprising oxygen molecules and an inner sleeve surface in ionic communication with said second proton exchange catalyst, wherein a concentric annular space is formed between said outer membrane surface and said inner sleeve surface;
    wherein said second catalyst comprises a mixture of carbon powder and catalyst powder disposed within said concentric annular space.

29. The cylindrical fuel cell of claim 24 wherein said anode and said first proton exchange catalyst comprise a mixture of carbon powder and catalyst powder.

30. The cylindrical fuel cell of claim 24 wherein
    said anode comprises a rigid porous rod comprising a conductive matrix; and
    said anode outer surface comprises a mixture of atoms (a) selected from the group consisting of carbon, said first proton exchange catalyst, and said polymer electrolyte, and (b) selected from the group consisting essentially of carbon and said catalyst.

31. The cylindrical fuel cell of claim 24 wherein said second proton exchange catalyst comprises a separate sheet of catalyst doped electrode material concentrically secured around and in ionic communication with said outer membrane surface.

32. A method of manufacturing a cylindrical fuel cell comprising:

providing an inner polymer electrolyte membrane comprising a membrane outer surface and a membrane inner surface, wherein said membrane inner surface defines a tubular compartment;

packing said tubular compartment with a powder comprising carbon and a first proton exchange catalyst to form an anode comprising a substantially rigid cylindrical porous conductive matrix comprising an anode outer surface, said anode comprising sufficient porosity for effective fluid communication between hydrogen gas and said first proton exchange catalyst;

providing a source of said hydrogen gas in fluid communication with said first proton exchange catalyst via said porosity; and disposing around and in ionic communication with said membrane outer surface a cathode comprising a catalytically effective amount of a second proton exchange catalyst.

33. The method of claim 32 further comprising contacting a first current collector with said anode;

contacting a second current collector with said cathode.

34. The method of claim 32 wherein said disposing around and in ionic communication with said membrane outer surface a cathode comprising a catalytically effective amount of a second proton exchange catalyst comprises packing a powder comprising a mixture of carbon powder and catalyst powder into an annular space defined by an inner wall of a tubular outer polymer electrolyte membrane comprising a closed end and said membrane outer surface.

* * * * *

UNITED STATES PATENT AND TRADEMARK OFFICE
CERTIFICATE OF CORRECTION

PATENT NO. : 6,001,500
DATED : December 14, 1999
INVENTOR(S) : Bass, et. al.

It is certified that error appears in the above-identified patent and that said Letters Patent is hereby corrected as shown below:

Title page, after item [76], insert item [73] to read: Assignee: Southwest Research Institute, San antonio, Texas--

Signed and Sealed this

Fourteenth Day of November, 2000

Attest:

Q. TODD DICKINSON

*Attesting Officer*   *Director of Patents and Trademarks*